June 15, 1926.
R. D. PIKE ET AL
METALLURGICAL PROCESS AND ARTICLE
Filed July 8, 1924
1,588,806
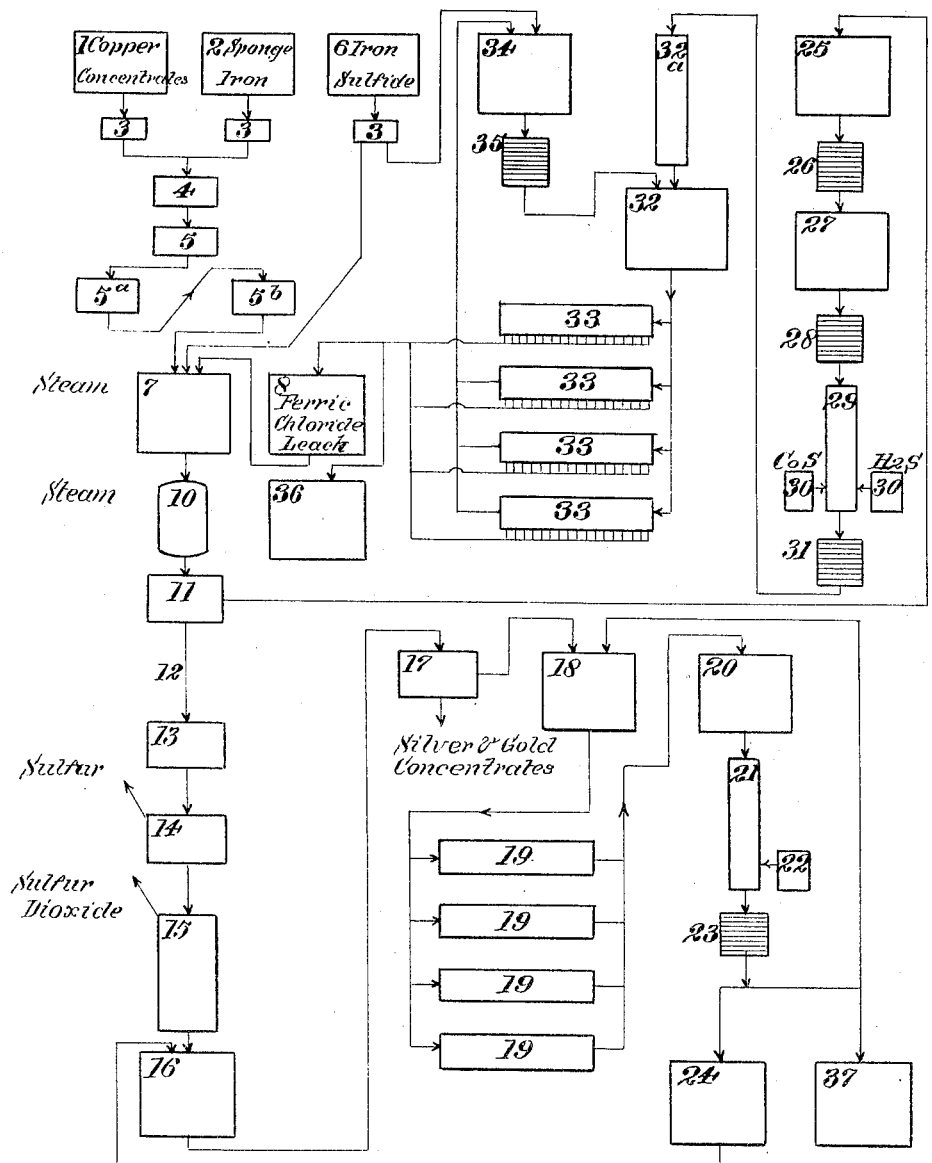

Patented June 15, 1926.

1,588,806

UNITED STATES PATENT OFFICE.

ROBERT D. PIKE, OF SAN MATEO, AND GEORGE H. WEST, OF ALBANY, CALIFORNIA; SAID WEST ASSIGNOR TO SAID PIKE.

METALLURGICAL PROCESS AND ARTICLE.

Application filed July 8, 1924. Serial No. 724,788.

The object of our present invention is to recover from sulphide ores, whether simple or complex, by a cyclic, hydrometallurgical process, their precious and non-ferrous metals, iron, and a large part of their sulphur. It is distinguished from present known process in certain important particulars, notably in the wide range of sulphide minerals which it can treat profitably, and in its recovery of the iron content of the ore as electrolytic iron, and of the sulphur content as elemental sulphur and in the use of iron sulphide as precipitant for copper. Ores can be treated before concentration, but our process requires electric power in large quantities and for this reason we consider it preferable to concentrate the ores by well known means and to ship the concentrates to the reduction plant employing our process, which will be situated at some advantageous central location near a source of relatively cheap power. It is also preferable to employ concentrates because the content of such objectionable materials as lime, magnesia, alumina, and silica has been reduced in them to small amounts.

As the first step the minerals should be first pulverized, but flotation concentrates are already fine enough.

The next step is to treat the concentrate in an open digestor with an excess of boiling hot solution which consists substantially of 140 grams of iron per liter, 70 grams being as ferrous chloride and 70 grams as ferric chloride. A considerable excess of the solvent is used so as to rapidly dissolve a large part of the copper, silver, lead, zinc, arsenic, etc. which may be present together with such of the gold as may be soluble. A portion of the iron is also dissolved by this treatment. No exact statement can be made covering each case, of the amount of excess solution to be added, but in general this is decided from consideration of the rapidity of solution of the metals, and also of the amount of electrolytic iron which it is desired to produce. The reaction occurring in this step is that between a metallic sulphide and ferric chloride whereby the metal from the sulphide is dissolved, the ferric iron is reduced to ferrous, and elemental sulphur is precipitated. A typical probable reaction is shown in equation (1)

$$Cu_2S + 2FeCl_3 = Cu_2Cl_2 + 2FeCl_2 + S$$

There is nothing in our process to preclude the use of ferric sulphate leach instead of ferric chloride, but we have found the ferric chloride to be far preferable. The chemical reactions for decomposing sulphides proceed more rapidly and completely with it than with ferric sulphate, and it is a more suitable electrolyte for the production of electrolytic iron in a subsequent step of our process. We have also discovered that the precipitation of copper by iron sulphide described later, proceed far more rapidly in chloride than in sulphate solutions and to a greater state of completion.

Boiling is continued and the next step is to add some pulverized and chemically active iron sulphide. For this purpose we may employ pyrrhotite, iron matte, or low grade copper matte. If either of these minerals contain other valuable metals, so much the better. For example we may make the iron matte by pyritic smelting of a cupriferous pyrite containing gold or silver or both, of which large quantities are available and which is not readily treated by present processes. Sufficient of the iron sulphide is added to reduce all of the excess ferric chloride remaining in the leach. The probable reaction is shown in equation (2)

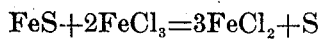
$$FeS + 2FeCl_3 = 3FeCl_2 + S$$

The reduction of the ferric iron proceeds rapidly and the reactions indicated by equations (1) and (2) will occur in from one to two hours.

But another reaction proceeds at the same time as equation (2) which is somewhat similar to reactions occurring in the geological process of secondary enrichment, but whereas these latter reactions have hitherto been studied by geologists on a laboratory scale in sulphate solutions and have been reported to proceed very slowly, we have been the first to discover the conditions for the speedy and complete carrying out of reactions of this type so as to render them applicable to industrial processes. These conditions are principally the use of chloride solutions and the use of temperatures higher than normal boiling temperatures as described later. The reaction, then, which proceeds along with that shown by equation (2) may probably be represented by the following equation (3)

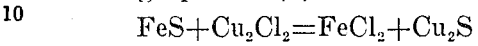

A similar reaction can be written for the reprecipitation of silver. Whether these reactions actually represent what occurs, or not, the fact remains that as soon as sufficient iron sulphide has been added to reduce the ferric iron the copper and silver begin to precipitate as sulphides.

The amount of ferrous sulphide which is to be added is calculated as the sum of the quantities demanded by equations 2 and 3, plus a slight excess. The reaction is continued in the open digestor until the solution has become substantially reduced. The solution and the precipitate are then transferred to a pressure digestor, where a steam pressure of 50# to 100# per square inch is applied for a period of from one to two hours. This effects a substantially complete reprecipitation of the copper, silver and gold; and a high extraction as soluble chlorides of all of the iron, lead, zinc which occurred in the original concentrates, and in the iron sulphide which was added for reduction and reprecipitation.

The pressure digestor just referred to is preferably a steel vessel lined inside with copper and provided with means for admitting steam for heating and a means for agitating so as to keep the solids in suspension during treatment.

After the treatment in the pressure digestor the solids are filtered out. These contain copper, silver and gold, the insoluble gangue from the original concentrates and from the iron sulphides, and a considerable portion of elemental sulphur. After the latter has been distilled off or otherwise removed the residue is a concentrate of copper, silver and gold which is considerably richer in these metals and lower in iron than the original concentrate. In view of the fact that the contained minerals are all reprecipitated and physically separate from the gangue, they can be separated from the latter, if desired, by flotation.

These solids can be treated by any known means for the recovery of copper, silver and gold, but if electrolytic copper is the end product desired, the preferable method is to give a mild oxidizing roast and then to leach with regenerated sulphuric acid leach from the electrolytic copper tank cells. The resulting solution is practically pure copper sulphate, which lends itself readily to the production of pure electrolytic copper. The residue from the leach is a rich concentrate of gold and silver.

The solution from the filtration step, after the pressure digestor, contains principally ferrous chlorides and chlorides of lead and zinc, if these metals were present in the original concentrate or iron sulphide, and chloride of lime, magnesia, and alumina, and it will also contain small amounts of copper and silver which can be precipitated by iron in usual manner, and this precipitate may be added to the other precipitate or treated separately. The lead, zinc and traces of other metals which may be present, are removed by any suitable known method and the resulting solution containing ferrous chloride and the chlorides of lime, magnesia, and alumina is then subjected to electrolysis in diaphragm cells of suitable design for the plating out of electrolytic iron, and the regeneration of ferric chloride. Sufficient of the regenerated leach liquor is now removed from the cycle to keep down the accumulated lime, magnesia and alumina to within allowable limits, and this discarded portion is treated by any suitable known means for the recovery of chlorine, which is returned to the process.

We have found that the use of the pressure digestor is not essential to the reprecipitation of the copper, but by its use, the reaction is greatly speeded up, the quantity of iron sulphide required to be added is less, and less iron will be found in the precipitate. This latter point is important, because the smaller the quantity of iron which remains in the copper, silver, gold concentrate, the more efficiently and easily may the process be carried out for the direct production of electrolytic copper.

The sulphides of other metals which are electropositive to those metals which it is desired to precipitate may be employed, but in practise it is usually desired to precipitate copper, and the most available sulphide for this purpose is the sulphide of iron.

Having now described our process in general terms, we will describe in more detail its application to a typical chalcopyrite concentrate containing about 25% copper.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the drawing illustrating, in diagram, a flow sheet, and in the same—1 represents a storage for the copper concentrates and 2 the storage for sponge iron. To every 100 lbs. of concentrate weighed out in weighing machine 3, 5-10 lbs. of sponge iron are added, and the two are mixed in mixing drum 4, then transferred to reducing roaster 5, where the reaction covered in application for Letters Patent filed on even date herewith and bearing Serial Number 724,799, entitled Process for reducing sulphide ores with iron, is carried out. The reduced concentrate goes to storage 5ª and a weighed batch passes through scales 5ᵇ and then into open batch digestor 7. The addition of the sponge iron may be omitted, if desired. The batch digestor 7 is preferably a tank lined with stoneware and provided with a hard wood stirring mechanism and an open jet steam pipe for heating to boiling temperature. For each 100# concentrate taken into 7, there are added 3450 lbs. of ferric chloride leach from 8, which is a solution containing about 70 grams of ferric iron and 70 grams ferrous iron as chlorides per liter, together with variable amounts of lime, magnesia and alumina chlorides. The concentrate is treated in the digestor 7 with the stated amount of ferric chloride leach at boiling temperature for about one hour. There is then drawn from iron sulphide storage 6, through weighing machine 9, about 80 lbs. of pulverized iron sulphide, which is added to the charge in digestor 7, and the agitation continued for another hour at boiling temperature. The entire charge from 7 is then transferred to a pressure digestor 10, lined with copper, rubber or other suitable resistant material, where it is agitated for about another hour with a steam pressure, introduced by an open steam pipe going to the bottom of the digestor of 50#-100# per square inch.

After this last treatment substantially all of the copper, silver, gold sulphur, a small remaining part of the iron, and the insoluble gangue are in the precipitate, and most of the iron together with any traces of zinc, which may have been introduced are in the solution as chorides, the iron, of course, being in form of ferrous choride.

The charge is now filtered by filter 11, and the cake is dried in 13, and distilled in 14 at 500–600 C. to drive off from 35%–40% of sulphur. This distillation is performed away from oxygen at a temperature of 932–1112 degrees F. so that any CuS present is reduced to $Cu_2S$; by equation

$$2CuS + heat = Cu_2S + S$$

The residue, after distillation, is subjected to a mild oxidizing roast in 15, which fixes some of the remaining sulphur as sulphate. The calcines go digestor 16 where they are leached with regenerated sulphuric acid. The resulting solution of practically pure copper sulphate is filtered at 17, the filter cake containing the gold and silver in highly concentrated form. The copper sulphate solution goes to supply tank 18, and then to electrolytic tank cells 19. The electrolyte drains into tank 20, then through treating tank 21, where any ferric iron which may be present is reduced by $SO_2$ furnished by sulphur burner 22, or taken from roaster 15. The electrolyte is then filtered at 23, and a portion circulated back to 18. Of the balance a portion of sufficient size to keep down accumulating impurities is discarded into tank 37 and reserved for recovery of its copper content on scrap or sponge iron, and the balance or net, regenerated acid leach goes to storage tank 24.

The solution from filter 11 may contain traces of silver and copper. The former is precipitated on copper in step 25, and the solution is clarified in filter 26. The last traces of copper are removed in step 27 by precipitating on sponge iron, and the cement copper is removed in filter 28. The solution may be treated with $H_2S$ or $CaS$ or both in step 29 for removal of traces of zinc and arsenic, and the purified solution is then filtered in 31.

As open stem jets are used for heating, some water will accumulate in the electrolyte. This is evaporated in step 32ª which preferably represents a dryer of the type in which the liquor is sprayed into hot gases of combustion in a tunnel. The purified and concentrated electrolyte now goes to supply tank 32, where it is fed to the electrolytic diaphragm cells 33, in which the iron which has been dissolved in the cycle is plated out as pure electrolytic iron, and the ferric chloride leach is regenerated in the anode compartments. The catholyte is continually recirculated draining into digestor 34, where it is treated with iron sulphide to reduce any ferric iron which may have leaked through the diaphragms. The solution is clarified in filter 35, and returned to supply tank 32. A portion of the anolyte of sufficient size to keep the accumulated chlorides of lime magnesia and alumina within allowable limits is discarded into tank 36, and reserved for subsequent treatment for the recovery of chlorine which is returned to the cycle. The balance of the regenerated leach goes to supply tank 8.

Our process will normally result in recovery of over 95% of the copper, silver and gold in the concentrate, the copper being in the form of pure electrolytic copper, and there are produced as by-products for each lb. of copper, somewhat in excess of 2.5 lbs. pure iron and about 1.75 lbs. of pure sulphur.

Our process results in maximum economy and profit in treatment of ores of the described class because; first, the copper is recovered primarily as a very pure electrolytic copper; second, iron which is lost in other metallurgical processes is recovered as a by-product in practically chemically pure form; third, sulphur which is discarded by other processes as $SO_2$ is largely recovered as a by-product in the form of pure elemental sulphur; fourth, all of the precious metals are easily recovered as by-products of the main cycle; fifth, the use of metallic iron for precipitating copper is practically eliminated, and cheap iron sulphide which may contain values of copper, silver and gold is used instead. By the use of our process it is possible to assemble copper concentrates from far distant mines at sources of cheap power, and to recover their copper contents at a net cost lower than is attainable by other known means.

We claim:—

1. A metallurgical process for recovery of metals from ores which consists in digesting with solutions containing an excess quantity of ferric iron, to dissolve substantially all of the metals which are soluble in ferric iron solutions, then adding sulphide of iron in sufficient quantity to first reduce all excess ferric iron to ferrous and second to reprecipitate certain metals at temperatures in excess of atmospheric boiling, and separating the precipitate in which the iron content has been reduced and the content of the said certain other metals increased as compared with the orginal ore.

2. A metallurgical process for recovery of metals from ore which consists in digesting at substantially atmospheric boiling point with solutions containing an excess quantity of ferric iron to dissolve substantially all of the metals which are soluble in ferric chloride solutions, adding sulphide of iron in sufficient quantity to first reduce substantially all excess ferric iron to ferrous and second to reprecipitate certain metals, subjecting the mixture of iron sulphide and solution to a temperature in excess of atmospheric boiling, to hasten the reprecipitation of the said certain metals to completion, and separating the precipitate in which the iron content has been reduced and the contents of the said certain other metals increased as compared with the original ore.

3. A metallurgical process for recovery of metals from ores which consists in digesting with solutions containing an excess quantity of ferric iron, to dissolve substantially all of the metals which are soluble in ferric iron solutions, then adding sulphide of iron in sufficient quantity to first reduce all excess ferric iron to ferrous and second to reprecipitate certain metals at temperatures in excess of atmospheric boiling, separating the precipitate in which the iron content has been reduced and the content of the said certain other metals increased as compared with the original ore, and subjecting precipitate to distilling at a temperature above the boiling point of sulphur and away from oxygen to remove distillable sulphur therefrom.

4. A metallurgical process for recovery of metals from ores which consists in digesting with solutions containing an excess quantity of ferric iron, to dissolve substantially all of the metals which are soluble in ferric iron solutions, then adding sulphide of iron in sufficient quantity to first reduce all excess ferric iron to ferrous and second to reprecipitate certain metals at temperatures in excess of atmospheric boiling, separating the precipitate in which the iron content has been reduced and the content of the said certain other metals increased as compared with the original ore, subjecting precipitate to distilling at a temperature above the boiling point of sulphur and away from oxygen to remove distillable sulphur therefrom, and separating the gangue from the distilled concentrate.

5. A metallurgical process for recovery of metals from ores which consists in digesting at substantially atmospheric boiling point with solutions containing an excess quantity of ferric iron to dissolve substantially all of the metals which are soluble in ferric iron solutions, adding sulphide of iron in sufficient quantity to first reduce all excess ferric iron to ferrous and second to reprecipitate certain metals, subjecting the mixture of iron sulphide and solution to a temperature in excess of atmospheric, boiling to hasten the reprecipitation of the said certain metals to completion, separating the precipitates in which the iron content has been reduced and the contents of the said certain other metals increased as compared with the original ore, and subjecting precipitate to distilling at a temperature above the boiling point of sulphur and away from oxygen to remove distillable sulphur therefrom.

6. A metallurgical process for recovery of metals from ores which consists in digesting at substantially atmospheric boiling point with solutions containing an excess quantity of ferric chloride to dissolve substantially all of the metals which are soluble in ferric chloride solutions, adding sulphide of iron in sufficient quantity to first reduce all excess ferric chloride to ferrous and second to reprecipitate certain metals, subjecting the mixture of iron sulphide and solution to a temperature in excess of atmospheric, boiling to hasten the reprecipitation of the said certain metals to completion, and separating the precipitate in which the iron content has been reduced and the contents of the said certain other metals increased as compared with the original ore, subjecting the precipitate to distilling at a temperature above the boiling point of sulphur and away from oxygen to remove distillable sulphur therefrom, and separating the gangue from the distilled concentrate.

7. A metallurgical process for recovery from ores of their content of precious, non-precious, ferrous metals and sulphur which consists in digesting with a solution containing an excess quantity of ferric chloride to dissolve substantially all of the metals which are soluble in ferric iron solution, adding sulphide of iron in sufficient quantity to, first, reduce substantially all excess ferric iron to ferrous, and, second, to reprecipitate certain metals, separating the precipitate, subjecting same to distillation at a temperature above the boiling point of sulphur and away from oxygen to remove distillable sulphur therefrom, heating the distilled precipitate for recovery therefrom of copper, gold and silver, and treating the solution after separation from the said precipitate for the recovery of electrolytic iron and the regeneration of the ferric iron leach solution.

8. A metallurgical process for recovery from ores of their content of precious, non-precious, ferrous metals and sulphur which consists in digesting with a solution containing an excess quantity of ferric iron to dissolve substantially all of the metals which are soluble in ferric chloride solution, adding sulphide of iron in sufficient quantity to, first, reduce all excess ferric chloride to ferrous, and, second, to reprecipitate certain metals, subjecting the mixture of iron sulphide and solution to a temperature in excess of atmospheric boiling so as to hasten the reprecipitation of said certain metals to completion, separating the precipitate, subjecting same to distillation at a temperature above the boiling point of sulphur and away from oxygen to remove distillable sulphur therefrom, treating the distilled precipitate for recovery therefrom of copper, gold and silver, and treating the solution after separation from the said precipitate for the recovery of electrolytic iron and the regeneration of the ferric chloride leach solution.

9. As a step in a metallurgical process the precipitation of copper from solution as sulphide on iron sulphide at temperatures above the boiling point at atmospheric pressure.

10. As a step in a metallurgical process the precipitation of copper from chloride solutions as sulphide on iron sulphide at temperatures above normal boiling point at atmospheric pressure.

In testimony whereof we have signed our names to this specification.

ROBERT D. PIKE.
GEORGE H. WEST.